(12) United States Patent
Altberg et al.

(10) Patent No.: US 8,451,825 B2
(45) Date of Patent: May 28, 2013

(54) SYSTEMS AND METHODS TO CONFIRM INITIATION OF A CALLBACK

(75) Inventors: Ebbe Altberg, Mill Valley, CA (US); Scott Faber, San Francisco, CA (US); Ron Hirson, San Francisco, CA (US); Sean Van Der Linden, Berkeley, CA (US); Paul G. Manca, Oakland, CA (US); Virginia Hong-Jia Yang, Foster City, CA (US)

(73) Assignee: UTBK, LLC, Wilmington, DE (US)

( * ) Notice: Subject to any disclaimer, the term of this patent is extended or adjusted under 35 U.S.C. 154(b) by 1508 days.

(21) Appl. No.: 11/678,012

(22) Filed: Feb. 22, 2007

(65) Prior Publication Data

US 2008/0207190 A1 Aug. 28, 2008

(51) Int. Cl.
*H04L 12/66* (2006.01)
*H04L 12/16* (2006.01)
*H04M 3/42* (2006.01)

(52) U.S. Cl.
USPC ......... 370/352; 379/201.01; 379/210.01; 379/216.01; 370/259

(58) Field of Classification Search
USPC ............ 370/352–356, 259–271; 379/210.01, 379/216.01
See application file for complete search history.

(56) References Cited

U.S. PATENT DOCUMENTS

| | | | |
|---|---|---|---|
| 5,793,851 A | 8/1998 | Albertson | |
| 6,910,159 B2 | 6/2005 | Phillips et al. | |
| 6,965,870 B1 * | 11/2005 | Petras et al. | 705/14.54 |
| 6,990,183 B2 | 1/2006 | Holland et al. | |
| 6,999,478 B2 | 2/2006 | D'Angelo | |
| 7,031,697 B2 | 4/2006 | Yang et al. | |
| 7,046,782 B2 | 5/2006 | Miller | |
| 7,142,840 B1 * | 11/2006 | Geddes et al. | 455/411 |
| 7,434,169 B2 | 10/2008 | Quillen et al. | |
| 8,027,878 B2 | 9/2011 | Wong et al. | |
| 2002/0035647 A1 * | 3/2002 | Brown et al. | 709/312 |
| 2003/0041255 A1 | 2/2003 | Chen et al. | |
| 2003/0115089 A1 | 6/2003 | Lurie | |
| 2003/0200202 A1 * | 10/2003 | Hsiao et al. | 707/3 |
| 2004/0038673 A1 | 2/2004 | Dunn et al. | |
| 2005/0071509 A1 | 3/2005 | Faber et al. | |
| 2005/0119957 A1 | 6/2005 | Faber et al. | |
| 2005/0239447 A1 * | 10/2005 | Holzman et al. | 455/414.3 |
| 2006/0034257 A1 * | 2/2006 | Hollatz et al. | 370/352 |
| 2006/0069610 A1 | 3/2006 | Rossini | |
| 2006/0159063 A1 * | 7/2006 | Kumar | 370/352 |
| 2007/0033102 A1 | 2/2007 | Frank et al. | |
| 2007/0250562 A1 | 10/2007 | Kumar | |

OTHER PUBLICATIONS

Krantz, Peter, "Proposal for an Accessible Captcha," located at http://www.standards-schmandards.com/2005/captcha, Jan. 1, 2005.
USPTO Transaction History of U.S. Appl. No. 10/923,396, filed Aug. 20, 2004, entitled "Gate Keeper."

(Continued)

*Primary Examiner* — Asad Nawaz
*Assistant Examiner* — Joel Hamel
(74) *Attorney, Agent, or Firm* — Greenberg Traurig, LLP

(57) ABSTRACT

Methods and apparatuses to initiate callback with confirmation. In one embodiment, a method includes: receiving a reference (e.g., a callback phone number) in a request for a connection to a destination; providing a code via the reference in response to the request; receiving a code to confirm the request; determining whether the received code matches the provided code; and initiating a connection via the reference for the connection to the destination if the received code matches the provided code.

17 Claims, 10 Drawing Sheets

OTHER PUBLICATIONS

USPTO Transaction History of U.S. Appl. No. 11/624,641, filed Jan. 18, 2007, entitled "Systems and Methods to Block Communication Calls."

USPTO Transaction History of U.S. Appl. No. 11/697,932, filed Apr. 9, 2007, entitled "Systems and Methods to Provide Connections via Callback Acceptance."

* cited by examiner

SYSTEMS AND METHODS TO CONFIRM INITIATION OF A CALLBACK

TECHNOLOGY FIELD

At least some embodiments of the disclosure relate to providing communication connections in general, and more particularly but not exclusively, to providing communication connections via callback.

BACKGROUND

Internet, cellular communication systems, television, newspaper, etc., provide diverse communication media channels through which people may receive information and/or communicate with each other.

For example, telephone systems allow users to conduct real time two-way/full-duplex communications in voice. Traditional land-line based telephone systems connect one telephone set to another through one or more switching centers, operated by one or more telephone companies, over a land-line based telephone network. Traditionally, a telephone connection is based on a circuit switched network.

Current telephone systems can also use a packet-switched network for a telephone connection. A packet switched network is typical in a computer data environment. Voice over Internet Protocol (VoIP) allow the delivery of voice information using a packet-switched network, such as the Internet, in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide services, such as call forwarding. Call forwarding of a telephone system allows a user of a phone at a given phone number to dial a specific sequence on the phone to cause the telephone system to forward incoming calls addressed to the phone number to another specified phone number that is indicated by the dialed sequence.

Click-to-call is another service which allows users to click a button in a web page to request a voice connection to a destination. The call can be initiated from the user side via VoIP, or be initiated via a callback to a phone number that is specified by the user.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users or that returns the result of a user requested search. Since advertisements included in the web pages contain a limited amount of information (e.g., a small paragraph, an icon, etc.), the advertisements can provide links to web sites that provide further detailed information.

In certain arrangements, the advertisers pay the advertisements based on the number of visits directed to the web sites through the links embedded in the advertisements. Thus, the advertisers pay for the performance of the advertisements.

Performance based advertising generally refers to a type of advertising in which an advertiser pays for a measurable event that is a direct result of an advertisement being viewed by a consumer. For example, measurable events for some advertisements are based on the selection ("click") of the advertisements by the customers to follow the links embedded in the advertisements to the web sites of the advertisers.

SUMMARY OF THE DESCRIPTION

Methods and apparatuses to initiate callback with confirmation are described herein. Some embodiments are summarized in this section.

In one embodiment, a method includes: receiving a reference (e.g., a callback phone number) in a request for a connection to a destination; providing a code via the reference in response to the request; receiving a code to confirm the request; determining whether the received code matches the provided code; and initiating a connection via the reference for the connection to the destination if the received code matches the provided code.

The disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding of the disclosure. However, in certain instances, well known or conventional details are not described in order to avoid obscuring the description. References to one or an embodiment in the present disclosure can be, but not necessarily are, references to the same embodiment; and, such references mean at least one.

In one embodiment, a system is provided to allow the confirmation of a callback request before a callback is performed to establish a communication connection.

FIGS. 1-4 illustrate methods to confirm callback request according to various embodiments of the disclosure.

Figure 1:
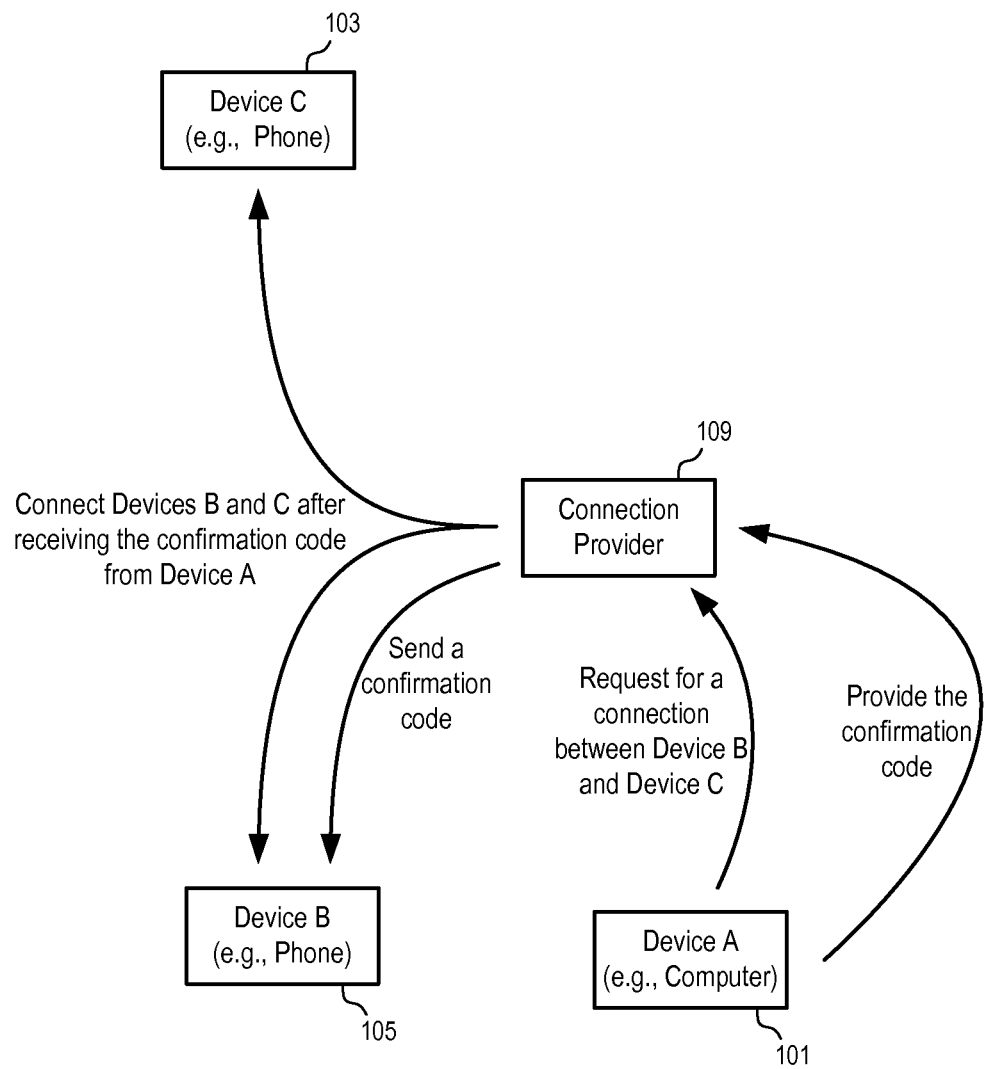
FIGS. 1-4 illustrate methods to confirm callback request according to various embodiments of the disclosure.

In FIG. 1, a connection provider (109) is capable of providing a communication connection via making separate connections to the device C (103) (e.g., a phone) and device B (105) (e.g., a phone).

For example, when the connection provider (109) receives a request for a connection between device B (105) and device C (103) from device A (101) (e.g., a computer), the connection provider (109) receives a communication reference (e.g., a phone number) of the device B (105). Using the communication reference of the device B (105), the connection provider (109) is capable of making a connection between the device B (105) and the connection provider (109).

In one embodiment, before the initiation of the connection to the device B (105), a confirmation code is sent to the device B (105) using the communication reference of the device B (105) that is received in the request from the device A (101). A user in control of the device B (105) can obtain the confirmation code and provide the confirmation code back to the connection provider (109) via the device A (101) to confirm the request.

After the connection provider (109) receives the correct confirmation code from the device A (101), the connection provider (109) then starts to connect devices B and C (105 and 103).

Thus, if the user of device A (101) is not in control of the device B (105), the user would not be able to provide the correct confirmation code to confirm the request. Such an arrangement can be used to prevent false requests from being used to harass the owner of the device B (105).

In one embodiment, the confirmation code is sent to the device B (105) without making a connection to the device B (105) for real time communication.

For example, instead of calling the device B (105), the confirmation code can be sent to the device B (105) via a data channel, such as SMS, email, presence status, etc. The delivery of the confirmation code is less intrusive for the user of the device B than a call for a connection for real time communication. For example, receiving a confirmation code to a mobile phone (e.g., cellular phone) via a text message is less annoying than an unsolicited call.

In one embodiment, the use of the confirmation code is required for the initiation of the requested connection in response to indications of abuse, error, or abnormality. For example, a confirmation code may be used after the device A (101) is used to request callbacks to a number of different devices in a short period of time, or a callback to the device B (105) in response to a previous request was not answered or disconnected shortly after being answered.

In one embodiment, the device B (105) is capable of supporting real time communication in voice, as well as data reception without a call. In one embodiment, the received data are designed to be viewed in response to a request from the user. Preferably, the reception of the data does not require the user to answer a call for a connection. Thus, the use of the data reception capability of the device B (105) to deliver the confirmation code can reduce the degree of intrusiveness, if the request is submitted from device A (101) without the authorization of the user of device B (105).

In one embodiment, the device used to submit the request for a callback is the same as the device that is to be called back. When the connection provider (109) determines that the user is in possession of the device that is to be called back, the connection provider (109) can make the requested connection without sending a confirmation code.

In one embodiment, when the connection provider (109) cannot determine whether the received request is from the user of the device that is to be called back, the connection provider (109) may send the confirmation code to the device B (105) and require the confirmation code from the requester to confirm the request.

In one embodiment, the confirmation code can be returned from device B (105). For example, a return SMS message responsive to the SMS message that contains the confirmation code from the connection provider (109) can be sent from the device B (105) to the connection provider to indicate that the user is ready to take the callback. Alternative, the SMS message sent from the connection provider (105) may include a phone number of the connection provider (105); and the user of the device B (105) can indicate the readiness for the callback by ringing the phone number of the connection provider (105) with a period of time of the callback request and then hanging up to receive the callback.

In one embodiment, the confirmation code can also used to authenticate the association relation between device A (101) and device B (105), such that the confirmation process for subsequent callback requests received from device A (101) for a callback to device B (105) may be suspended. For example, after the confirmation code is successfully received from a web browser, a piece of information (e.g., cookie) is stored for the browser to associate the device B (105) with the browser. Thus, subsequent requests from the browser to callback to device B (105) may not need further confirmation (e.g., until the expiration of a predetermined period of time, or until one callback to the device B (105) requested from the browser is rejected).

In one embodiment, a feedback from the device B (105) can be used to authenticate the association relation between device A (101) and device B (105). For example, an SMS message from the connection provider (109) to the device B (105) may include a phone number and a confirmation code. The user of the device B (105) can confirm the association relation between the device A (101) and device B (105) by calling the phone number provided in the SMS message and provide the confirmation code in the call. Alternatively, the user of the device B (105) may send a reply to confirm the association relation between the device A (101) and device B (105). Alternatively, when the user received the callback, the user may be prompt to confirm the association relation between the device A (101) and device B (105). For example, after the user picks up the call from the connection provider, the user can be connected to an interactive voice response system, which provides the message "We are calling you to connect you to Joe's plumber. If you did not make the request, please press 1; if you want to pre-authorize future callbacks initiated from the computer you just used to make the request, please press 2, . . . ". The user can use the dialing pad to provide feedback. In one embodiment, the connection provider (109) initiates the call to the device C (103) after the user of the device B (105) accepts the callback (e.g., explicitly by pressing a key, or implicitly by listening through the message and holding the line). In one embodiment, if the user of device B (105) accepts the callback, explicitly or implicitly, the connection provider (109) stores information to associate device A (101) and device B (105) such that future requests from device A (101) for callbacks to device (B) may not need further confirmation codes.

Figure 2:
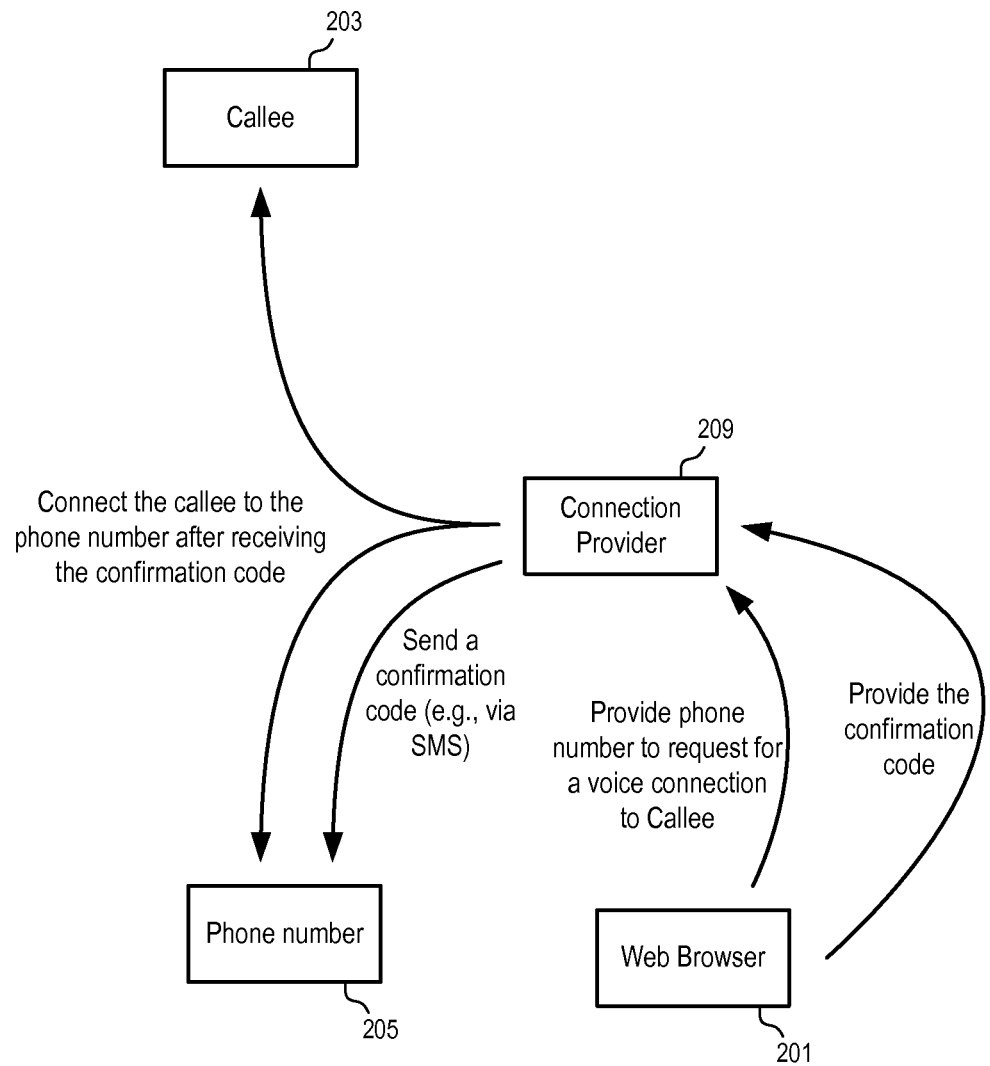

FIG. 2 illustrate an example of requesting a callback to a phone number (205) for a voice connection to the callee (203).

For example, a click-to-call icon may be presented in the web browser (201). When the click-to-call icon is selected in the web browser (201), a request for a callback to the phone number (205) is sent to the connection provider (209).

The phone number (205) may be provided to the connection provider via a subsequent page that allows the user of the web browser to enter the phone number. Alternatively, the phone number (205) can be configured to be stored in the computer that runs the web browser (201) and provided to the connection provider (209) when the click-to-call icon is selected. Alternative, the click-to-call icon may include a reference which can be used by the connection provider (209) to determine the phone number (205) (e.g., through decoding/decrypting the reference or through looking up the phone number from a database using the reference).

In one embodiment, the phone number (205) is for a phone that is connected to a landline from a circuit switched telephone network, or a mobile phone, such as a cellular phone, or a satellite phone.

In one embodiment, the phone number (205) is assigned by a telephone carrier to a VoIP-based telephone, such as a software-based phone, a Universal Serial Bus (USB) phone, a Bluetooth phone, etc. The phone number (205) can be dialed using a plain old telephone system over a circuit switched telephone network. When the phone number is being called from a circuit switched telephone network, the telephone carrier bridges the circuit switched telephone network and the packet switched network at the telephone number.

Alternatively, the phone number (205) is a VoIP-based phone reference, such as a user identifier of an instant messaging network, a uniform resource identifier, a session initiation protocol (SIP) address, etc.

In response to the web browser (201) providing the phone number (205) to the connection provider (209) for a callback, the connection provider (209) sends a confirmation code to the phone number via a data communication channel (e.g., via SMS).

In one embodiment, the connection provider (209) determines the capability of the device at the phone number (205) through looking up from a telephone directory. For example, when the telephone number is assigned to a cellular phone (e.g., serviced by a specific telephone carrier), the connection provider may determine that the device at the telephone number has the capability to receive SMS messages. In one embodiment, the connection provider (209) determines the capability of the device at the phone number (205) through receiving input from the web browser (201). In one embodiment, the connection provider determines the capability of the device at the phone number (205) from a database. The database may be owned by the connection provider or by a partner of the connection provider (e.g., a cellular telecommunication carrier, or a third party). In one embodiment, the connection provider may initiate communications to automatically interrogate the device at the phone number to populate the database.

In one embodiment, the request for a callback is sent from the web browser (201), when the user selects a click-to-call icon displayed in the web browser (201). Alternatively, the request for a callback can also be sent via other communication methods. For example, a request can be sent via an email gateway, or SMS gateway, an instant messaging (IM) gateway, or a custom application using a custom designed communication protocol.

In one embodiment, when the connection provider (209) fails to find a data communication channel to transmit a confirmation code to the phone number (205), the user may be instructed to call the connection provider (209) from the phone number (205) to obtain a confirmation code. When the user calls from the phone number (205) to obtain the confirmation code, the connection provider (209) can use the Automatic Number Identification (ANI) service to verify that the confirmation code is provided to a caller from the phone number (205).

Figure 3:
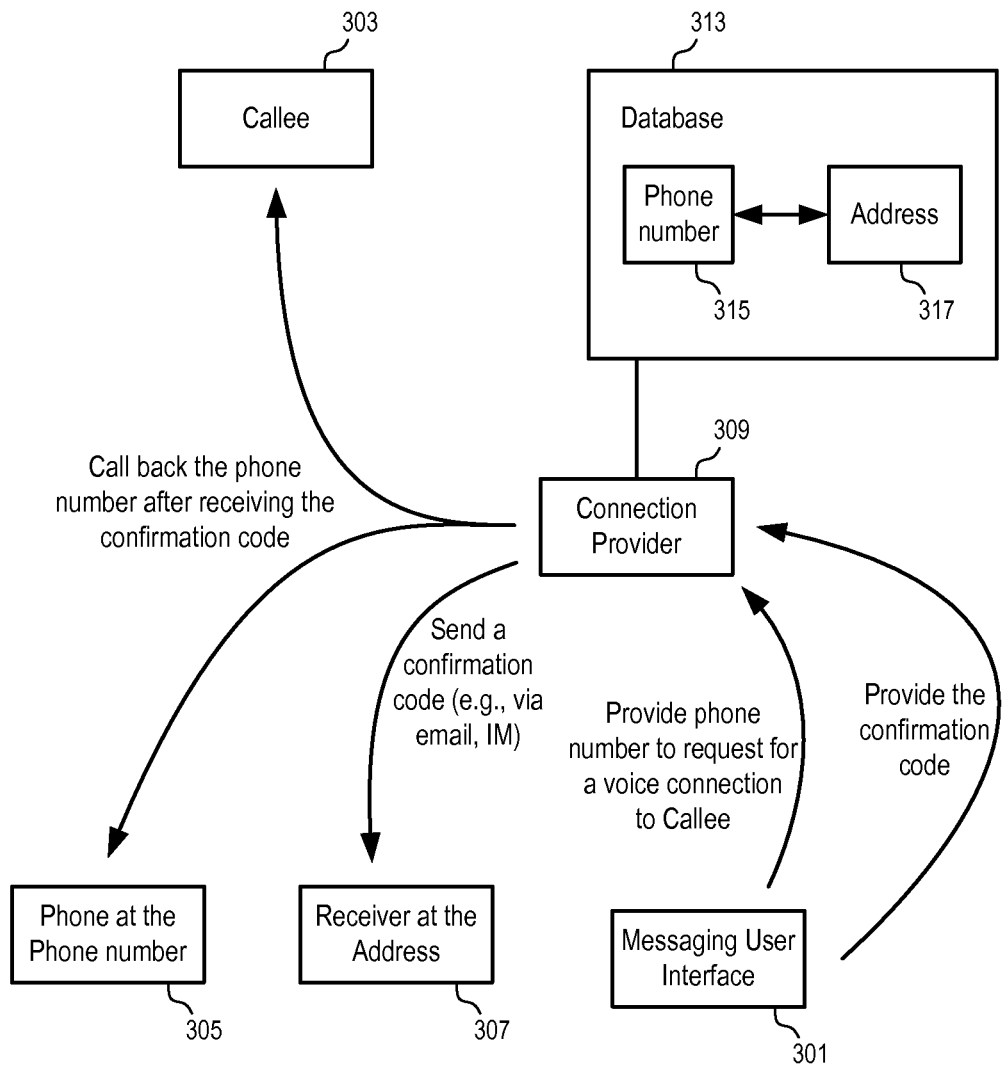

In one embodiment, instead of sending the confirmation code to the phone number (205), the confirmation code is sent to an address that has a know relation with the phone number, as illustrated in FIG. 3.

In FIG. 3, a messaging user interface (301) is used to provide the phone number (315) to the connection provider (309) to request for a voice connection to callee (303) via calling back the phone (305) at the phone number (315). Since the phone (305) may not support data reception, the connection provider (309) can look up an address (317) from the database (313) using the phone number (315) and send the confirmation code to the receiver (307) at the address (317). The receiver (307) may be an email reader, an instant messaging application, etc.

Alternatively, a known relation between the address and the phone number can be used to compute the address from phone number. For example, an email address associated with the phone number can be a combination of the phone number and a domain identifier of the telephone carrier of the phone number. The telephone carrier may deliver the email via SMS, or forward the email to another email address of the user.

In one embodiment, the phone (305) and the receiver (307) are separate devices. For example, the receiver (307) is running on a computer which may or may not run the messaging user interface (301) (e.g., a web browser for email or instant messaging or a standalone application). Alternatively, the phone (305) and the receiver (307) can be on the same device. For example, the receiver (307) may be an email client program running on the phone (305).

In one embodiment, the confirmation code is transmitted to the receiver (307) in a way which does not typically require the immediate attention of the user. For example, an email is typically queued in the inbox for viewing at a time convenient to the user.

In one embodiment, a presence status is used to transmit the confirmation code to the receiver (307) via an instant messaging network. For example, the connection provider may appear as a buddy of the user in the receiver (307); and the confirmation code is provided to the receiver (307) as part of the presence status information of the connection provider. If the user of the receiver is not the requester, the user would not be bothered by the status information of the connection provider. If the user is expecting the confirmation code, which is required for the confirmation of the request for a connection to the callee (303), the user can easily obtain the confirmation code and confirm the request for callback.

In FIG. 3, the connection to the callee (303), established via a callback, supports voice communication (e.g., a phone connection).

Alternatively or in combination, the connection process according to embodiments of the disclosure can also be used to provide a connection for instant messaging, image, video, file sharing, application sharing (e.g., common whiteboarding), etc.

For example, a callback may be used to establish a text chat session between a customer and an adviser. For example, a callback may be used to establish an application sharing session between a customer and a specialist for training, trouble shooting, etc. For example, a callback may be used to establish a video conferencing session for meeting, presentation, entertainment, etc.

In one embodiment, the connection provider bridges two individual connections to the callee and to the caller to provide privacy for the callee and/or the caller. Thus, the addresses and/or the identities of the callee and/or the caller are not revealed to each other through the communication connection. The caller and the callee may choose to remain anonymous to each other even after the communication session.

In one embodiment, the connection provider tracks the calls made to the callee through providing the connection. For example, pay for performance advertisements can be charged based on the communication leads generated for the advertisers. Through tracking the calls generated via advertisements, the advertisements can be charged on a per call basis (e.g., based on a count of calls). The calls may be a telephone call, a call for an instant messaging session which may support text, voice, image and/or video, a call for an application sharing session, etc.

Figure 4:
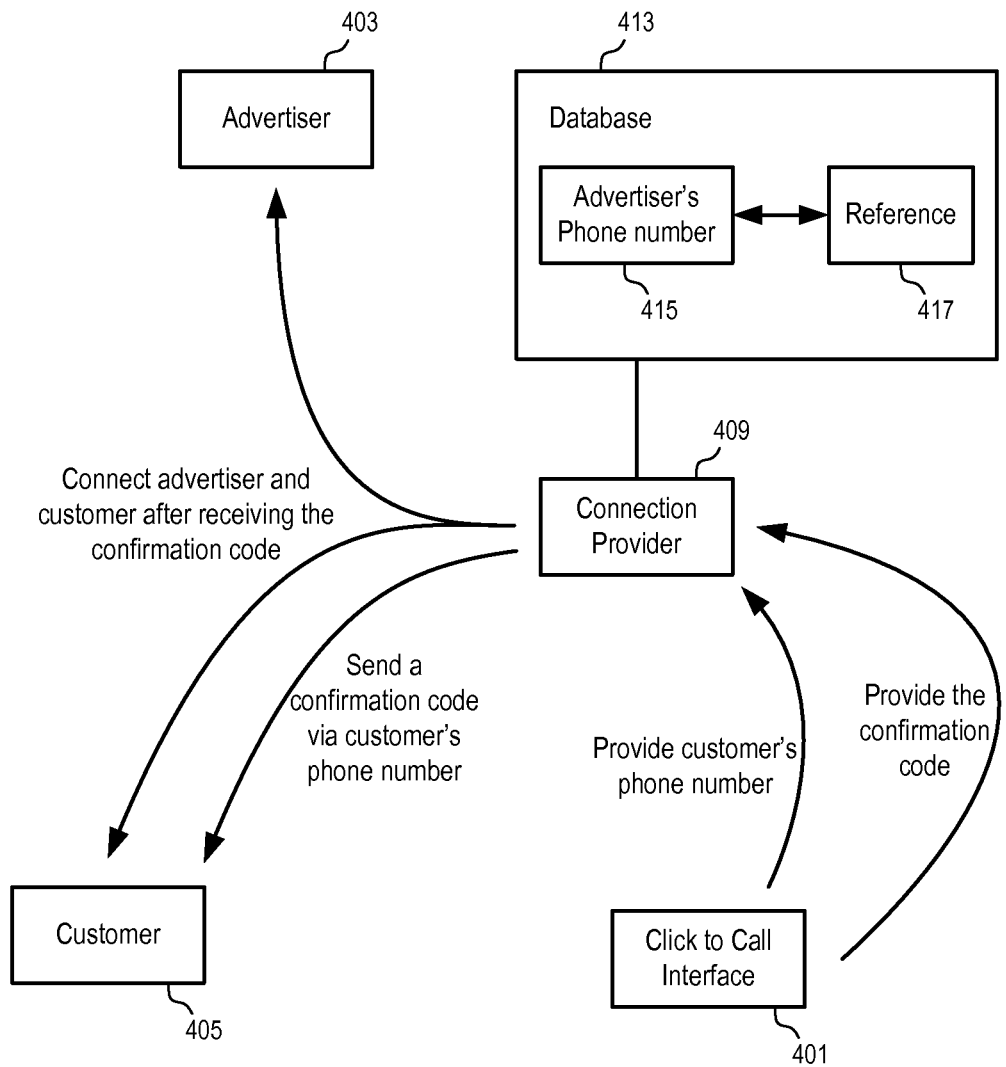

FIG. 4 illustrates an example in which an advertisement is provided with a click to call interface (401), which includes a selectable link, icon or button embedded in the advertisement. When selected, the click to call interface sends a request to the connection provider (409) for a callback.

In one embodiment, the click to call interface for the advertisement includes a reference (417) which is associated with the advertiser's phone number (415) in database (413). The reference (417) is sent to the connection provider (409) with the callback request; and the connection provider (409) looks up the advertiser's phone number (415) using the received reference (417).

In another embodiment, the click to call interface for the advertisement includes an encoded/encrypted version of the advertiser's phone number, which can be decoded/decrypted without relying upon a database (413). When a user clicks the interface, the encoded/encrypted version of the advertiser's phone number is sent to the connection provider, which can decode or decrypt the advertiser's phone number without relying upon a database.

The click to call interface also provides the customer's phone number to the connection provider.

Since the phone number of the advertiser (403) is not provided in the advertisement directly, a customer responding to the advertisement calls the advertiser (403) via the connection provider (409). Thus, the number of calls generated from the advertisement can be measured.

In one embodiment, to prevent the connection provider (409) from calling a wrong customer (e.g., because of an unintentional or intentional error in the phone number provided by the requester), the connection provider (409) may provide the confirmation code to the customer via the customer's phone number and require the correct confirmation code from the click to call interface (401) to connection the advertiser (403) and the customer (405).

In one embodiment, after the confirmation code is verified, the connection provider (409) initiates calls to both the advertiser (403) and the customer (405) (e.g., via VoIP calls). Based on the phone numbers of the advertiser (403) and the customer (405), the calls initiated from the connection provider (409) may be terminated by one or more telephone carriers at phones connected to a circuit switched network, or a package switched network.

In one embodiment, the advertiser (403) specifies the price bid for each calls received from the advertisement; and the advertisements are presented based at least in part on the price bids. For example, when the advertisements are presented in response to a search, the order in which relevant advertisements are presented can be based on the price bids.

In one embodiment, the advertiser (403) provides services (e.g., advice, entertainment, information, etc.) over the communication connection to the customer (405). The customer (405) is charged for the time of the advertiser (403); and a portion of the fee charged by the advertiser (403) is retained by the connection provider (409) for the service rendered by the connection provider (409).

In one embodiment, a seller who offers services over the communication connection provided by the connection provider (409) may include the click to call interface in their own web site, blog, email, etc. The click to call interface includes the reference (417) that is associated with the advertiser's phone number (415). Thus, the connection provider (409) provides the connection service but may or may not provide advertising service. In one embodiment, the connection provider (409) also provide the services of collecting fees from the customer (405) on behalf of the seller (e.g., advertiser 403), if the customer (405) purchases communication time with the seller.

Figure 5:
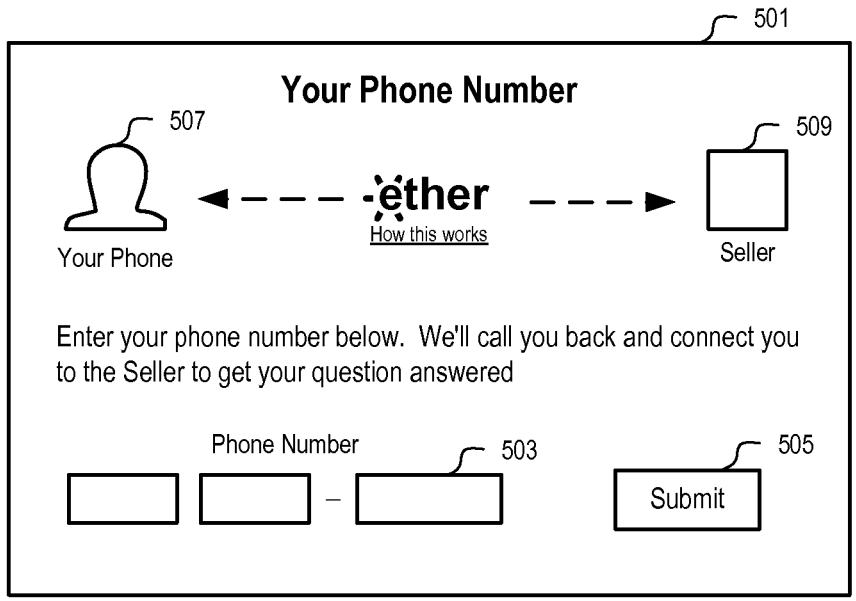
FIGS. 5-6 illustrate user interfaces which can be used to guide a user through a callback process according to embodiments of the disclosure.
Figure 6:
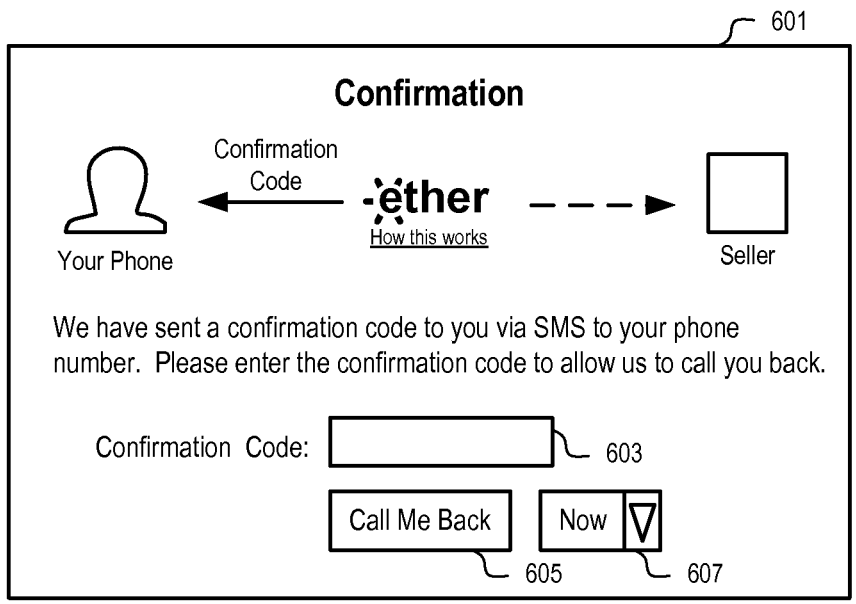

FIGS. 5-6 illustrate user interfaces which can be used to guide a user through a callback process according to embodiments of the disclosure. In FIGS. 5-6, a graphical representation of the connection process is presented with status information illustrating the progress of the connection process and instructions for the user to step through the connection process.

For example, in FIG. 5, the interface (501) shows that the connection to the phone of the user and the connections are to be established, as indicated by the dotted lines pointing to the icons (507 and 509) the represent the caller and the callee. The user is prompted to enter the phone number in entry boxes (503) and use the "submit" button (505) to provide the system with the callback phone number.

After the callback phone number is received, the interface (601) in FIG. 6 is shown, which indicates that a confirmation code has been sent to the phone number of the user. The user is prompted to enter the confirmation code in entry box (603) to confirm the request for call back using the "call me back" button (605). The user may choose to called back immediately or after a period of time using the selection box (607). In one embodiment, a user can select a time period from a set of pre-determined time periods (e.g., 1 minute, 2 minutes, 5 minutes, 10 minutes, 15 minutes, etc.). In another embodiment, the user can enter the minutes that the system should wait before calling back the phone number.

Figure 7:
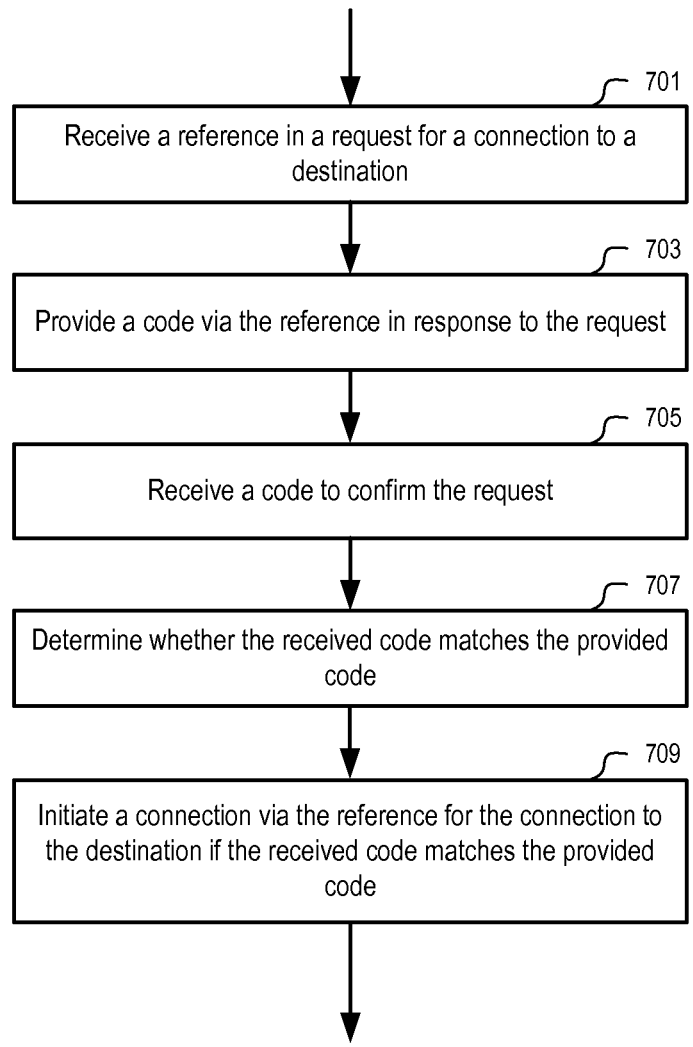
FIG. 7 shows a method to confirm a callback according to one embodiment of the disclosure.

FIG. 7 shows a method to confirm a callback according to one embodiment of the disclosure. In FIG. 7, a reference (e.g., a phone number) is received (701) in a request for a connection to a destination (e.g., a phone connection). The connection to the destination is to be established via calling back the requester according to the reference (and calling the destination). In response to the request, a code is provided (703) via the reference. A code is then received (705) to confirm the request. It is determined (707) whether the received code matches the provided code. If the received code matches the provided code, a connection is initiated (709) via the reference for the connection to the destination.

In one embodiment, the callback reference includes a session initiation protocol (SIP) address or a uniform resource identifier (URI) (e.g., for a voice connection, for an instant messaging connection, etc.).

In one embodiment, the code can be provided via the reference through a data channel addressed to the reference, such as short message service (SMS), or an address (e.g., an email address, an instant messaging identifier) determined according to the reference. In one embodiment, the code is provided to the address as presence status information.

In one embodiment, the code can be provided as a Completely Automated Public Turing test to tell Computers and Humans Apart (CAPTCHA), in a text format, an audio format, a voice format, or a video format.

In one embodiment, the provided code and the received code are determined to be matching with each other when the provided code and the received code are the same.

In another embodiment, the provided code and the received code are determined to be matching with each other when the provided code and the received code have a predetermine relation but are not the same. For example, the received code may be required to be one increment above the provided code.

In one embodiment, an instruction to manipulate the provided code to generate the code that is to be sent back to the connection provider for confirmation is provided with the confirmation code. In one embodiment, the instruction to manipulate the provided code to generate the code that is to be sent back to the connection provider for confirmation is provided in the click to call interface.

In one embodiment, the instruction is provided to prevent a machine from making the request without a human behind it. Thus, the confirmation process can also be used to verifying that the request is from a human user.

In one embodiment, the confirmation code is sent in the form of a Completely Automated Public Turing test to tell Computers and Humans Apart (CAPTCHA). For example, random words or letters are displayed in a distorted fashion so that they can be recognized by people, but not by software. The tests are typically formulated to require a solution to a difficult problem in the field of artificial intelligence (AI) to compile a software which could pass the tests.

In one embodiment, the confirmation code is sent in a text format according to the reference received. Alternatively, the confirmation code may be sent via voice mail, audio signal, image, video clip, etc.

Figure 8:
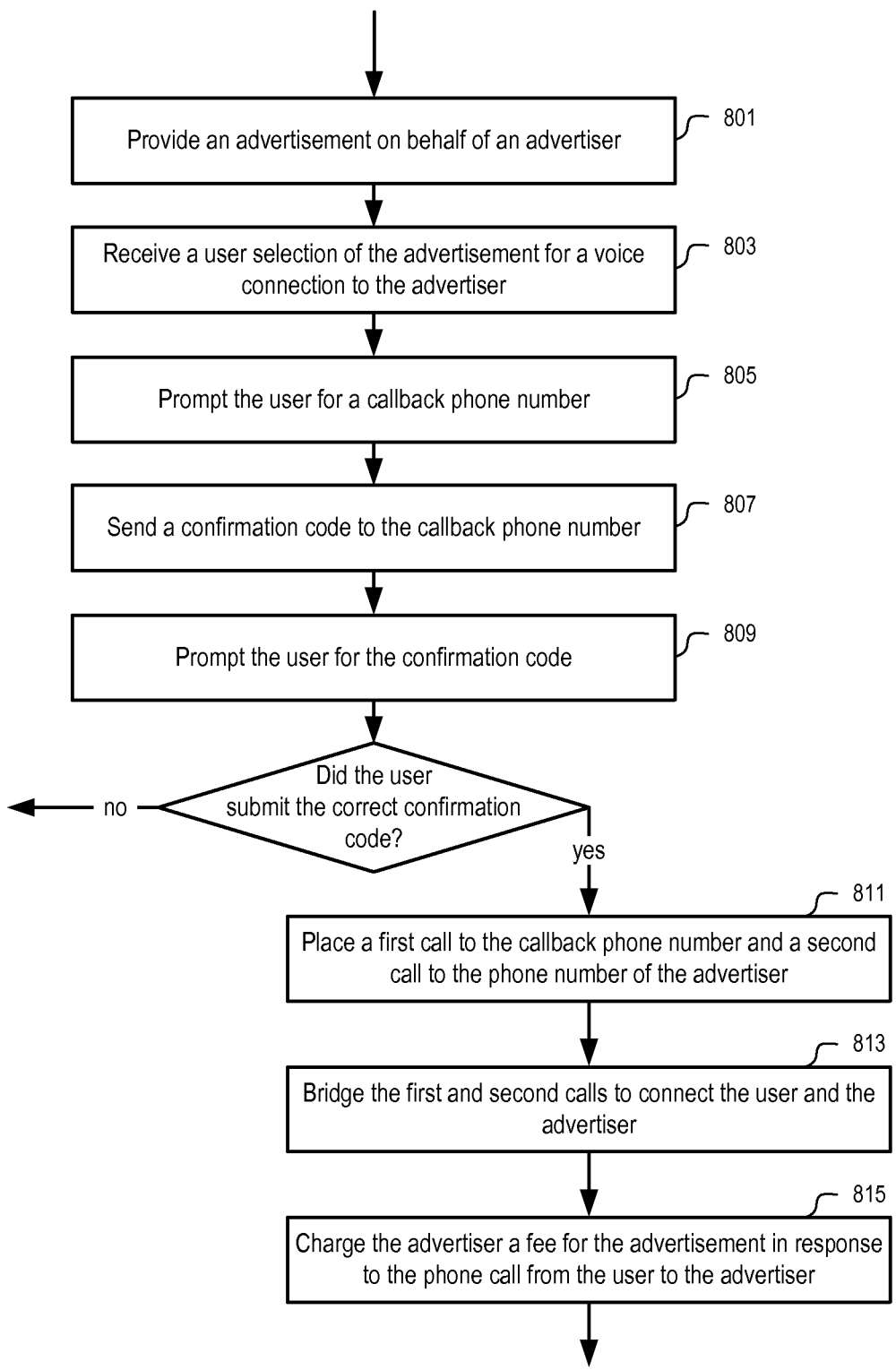
FIG. 8 shows a method to confirm a callback for voice connection to an advertiser according to one embodiment of the disclosure.

FIG. 8 shows a method to confirm a callback for voice connection to an advertiser according to one embodiment of the disclosure. In FIG. 8, an advertisement is provided (801) on behalf of an advertiser. A user selection of the advertisement for a voice connection to the advertiser is received (803). The user is prompted (805) for a callback phone number. After receiving the callback phone number, a confirmation code is sent (807) to the callback phone number (e.g., via SMS, MMS (multimedia messaging service), or email, or a status indicator). The user is then prompted (809) for the confirmation code.

It is then determined whether the user submitted the correct confirmation code. If the confirmation code received from the user is correct, a first call is placed (811) to the callback phone number and a second call to the phone number of the advertiser. The first and second calls are bridged (813) to connect the user and the advertiser. The advertiser is charged (815) a fee for the advertisement in response to the phone call from the user to the advertiser.

If the confirmation code received from the user is incorrect, the callback is not initiated. The user may resubmit the confirmation code or make a correction to the callback number.

Figure 9:
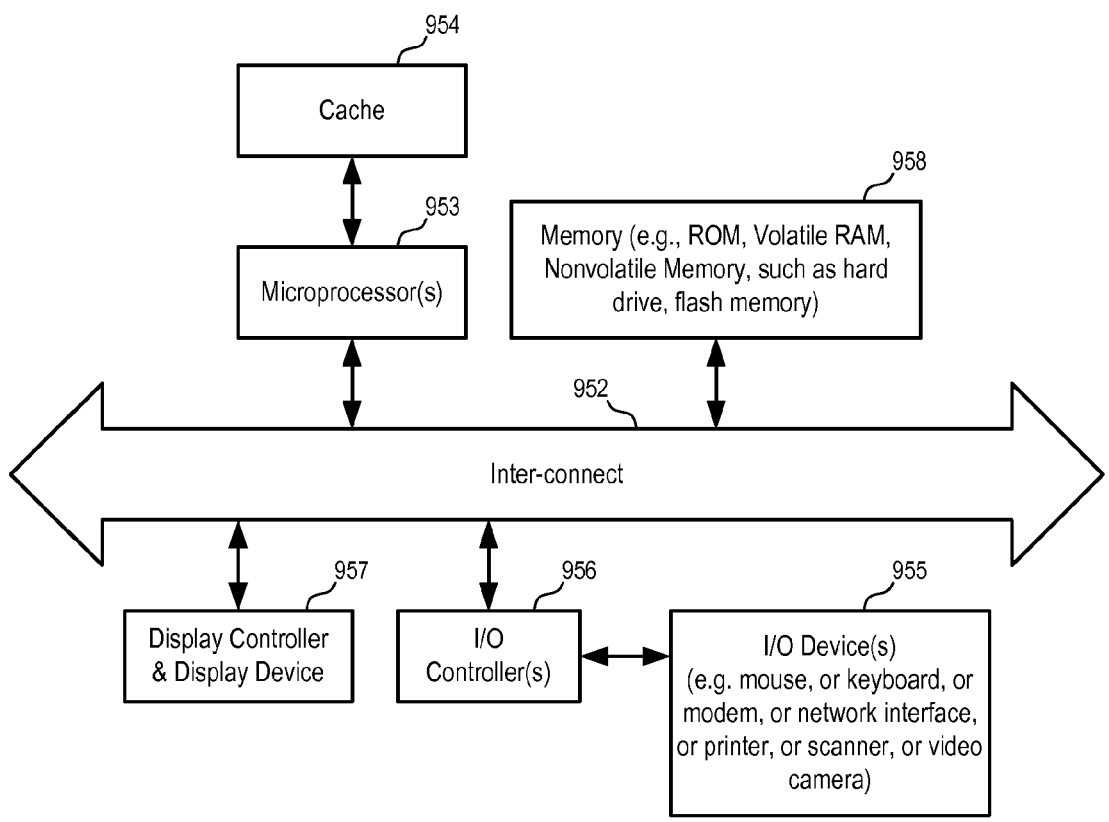
FIG. 9 shows a block diagram example of a data processing system which can be used in various embodiments of the present disclosure.

FIG. 9 shows a block diagram example of a data processing system which can be used in various embodiments of the present disclosure.

While FIG. 9 illustrates various components of a computer system, it is not intended to represent any particular architecture or manner of interconnecting the components. Other systems that have fewer or more components may also be used with the present invention.

In FIG. 9, the communication device (951) is a form of a data processing system. The system (951) includes an inter-connect (952) (e.g., bus and system core logic), which interconnects a microprocessor(s) (953) and memory (958). The microprocessor (953) is coupled to cache memory (954) in the example of FIG. 9.

The inter-connect (952) interconnects the microprocessor(s) (953) and the memory (958) together and also interconnects them to a display controller and display device (957) and to peripheral devices such as input/output (I/O) devices (955) through an input/output controller(s) (956). Typical I/O devices include mice, keyboards, modems, network interfaces, printers, scanners, video cameras and other devices which are well known in the art.

The inter-connect (952) may include one or more buses connected to one another through various bridges, controllers and/or adapters. In one embodiment the I/O controller (956) includes a USB (Universal Serial Bus) adapter for controlling USB peripherals, and/or an IEEE-1394 bus adapter for controlling IEEE-1394 peripherals.

The memory (958) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, the system of FIG. 9 is used to implement a connection provider (e.g., 109, 209, 309, 409).

Further, a user device (e.g., 103, 105, 101) as a client system can be implemented using a data processing system similar to the system of FIG. 9. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

Alternatively, the traditional communication client(s) (e.g., a plain old telephone system) may be used in some embodiments.

From this description, it will be appreciated that certain aspects of the disclosure are embodied in the user devices, certain aspects of are embodied in the server systems, and certain aspects are embodied in a system as a whole.

Embodiments of the disclosure can be implemented using hardware, programs of instruction, or combinations of hardware and programs of instructions.

Figure 10:
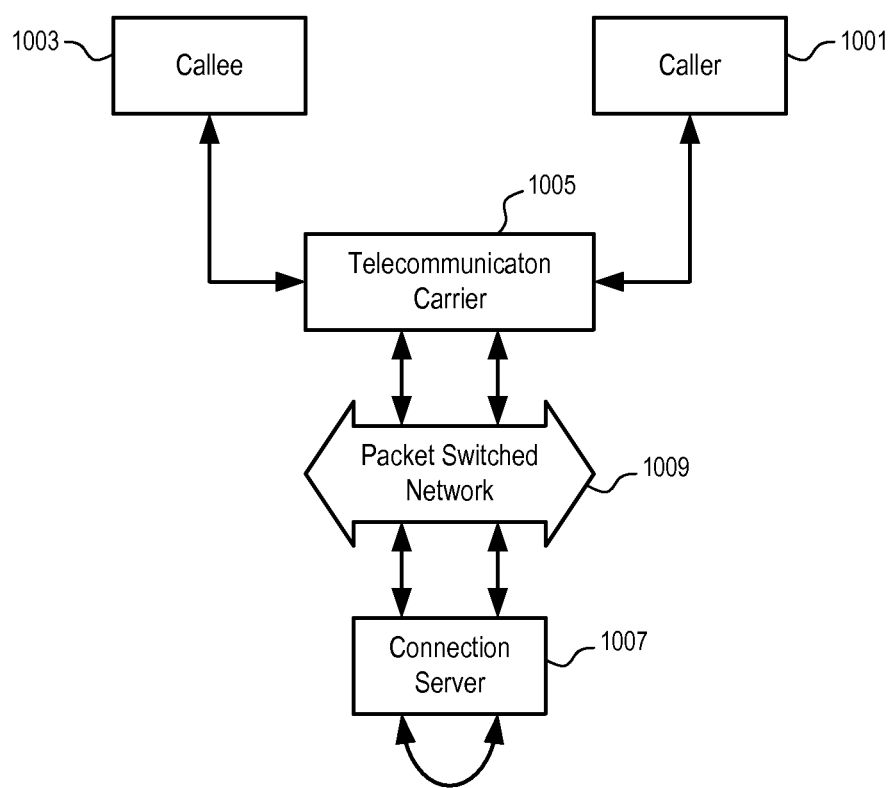
FIG. 10 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 10. In FIG. 10, the connection server (1007) receives and/or places telephone calls via the telecommunication carrier (1005) over the packet switched network (1009). The telecommunication carrier (1005) further routes the telephone communications towards the caller (1001) and the callee (1003).

Since the telecommunication carrier (1005) can route a call from a packet switched network to a variety of destinations (e.g., a traditional analog telephone set, a mobile phone, a cellular phone, a WiFi phone, a Bluetooth phone, a softphone running on a computer, etc.), the connection sever (1007) can use one type of communication connection with the telephone carrier (1005) to facilitate the communication connections with variety of devices used by the customers (e.g., callers and callees). Thus, the implementation of the connection server (1007) can be simplified. In one embodiment, the connection server (3307) can also place and/or receive direct VoIP calls to/from the caller (or callee).

For example, to make a voice connection in response to a click-to-call request, the connection server can place separate VoIP calls, via the telecommunication carrier (1005), to the caller (1001) (e.g., the requester of the click-to-call) and the callee (1003) (e.g., the destination of the click-to-call request).

If the caller (1001) (or the callee 1003) is on a public switched telephone network (PSTN), the telecommunication carrier (1005) bridges the packet switched the network and the public switched telephone network (PSTN). The telecommunication carrier (1005) routes the call from the packet switched network (1009) to the caller (1001) (or the callee 1003) on the circuit switched network. Thus, the caller (1001) (or the callee 1003) can use a telephone set to receive the call via a Plain Old Telephone Service (POTS). The connection server (1007) joins the separate calls that are placed via the packet switched network (1009) to connection the callee (1003) and the caller (1001).

In one embodiment, call signaling and media content may use different network paths. While call signaling is arranged to go through the packet switched network (1009) and the connection server (1007), the media stream does not have to go through the connection server (1007). For example, when the calls are joined, the media content may be redirected to flow over the communication carrier (1005) without going through the packet switched network (1009) to the connection server (1007) for improved performance and efficiency. The connection server (1007) can release the control over the media stream to allow the media stream to flow through the shortest path, without going through the connection server, while maintaining control to the connection for the call by staying on the path for call signaling.

In another example, when the caller (1001) initiates a call over a PSTN to the connection server (1007), the telecommunication carrier (1005) converts the call for the packet switched network (1009) for the connection server (1007).

In one embodiment, virtual softphones on the telecommunication carrier (1005) are assigned to the caller (1001) and the callee (1003) for interfacing with the connection server (1007) over the packet switched network (1009). The virtual softphones encapsulates the devices and networks used by the caller (1001) and callee (1003) to access the connection server (1007); and the telecommunication carrier (1005) shields the connection server (1007) from the implementation details of the user devices and networks used by the caller (1001) and the callee (1003). The connection server (1007) calls (or receives calls from) and connects the virtual softphones on the telecommunication carrier (1005) to connect the caller (1001) and the callee (1003).

In FIG. 10, the telephone connection between the telecommunication carrier (1005) and the connection server (1007) is facilitated via a packet switched network (1009). Thus, the connection server (1007) can operate efficiently in a digital domain. The connection server (1007) interfaces with the telecommunication carrier (1005) using one type of Internet Telephony systems (e.g., SIP-based Internet telephony).

Alternatively, a connection server may include some or all of the functionality of the telecommunication carrier (1005). For example, the connection server may be configured to bridge a packet switched network and a circuit switched network. The connection server may support multiple, different types of Internet Telephony systems.

In one embodiment, the connection server (1007) and the telecommunication carrier (1005) are operated by different, separate entities. Alternatively, the connection server (1007) and the telecommunication carrier (1005) may be operated by the same entity. In another embodiment, the telecommunication carrier (1005) includes a set of facilities operated by a number of separate entities.

In one embodiment, the caller (1001) and/or the callee (1003) may also place/receive calls via a packet switched network. The telecommunication carrier (1005) may route the calls between the caller (1001) and the callee (1003) without using a PSTN. In one embodiment, caller (1001) and/or the callee (1003) may place calls to or receive calls from the connection server (1007) via Internet.

Figure 11:
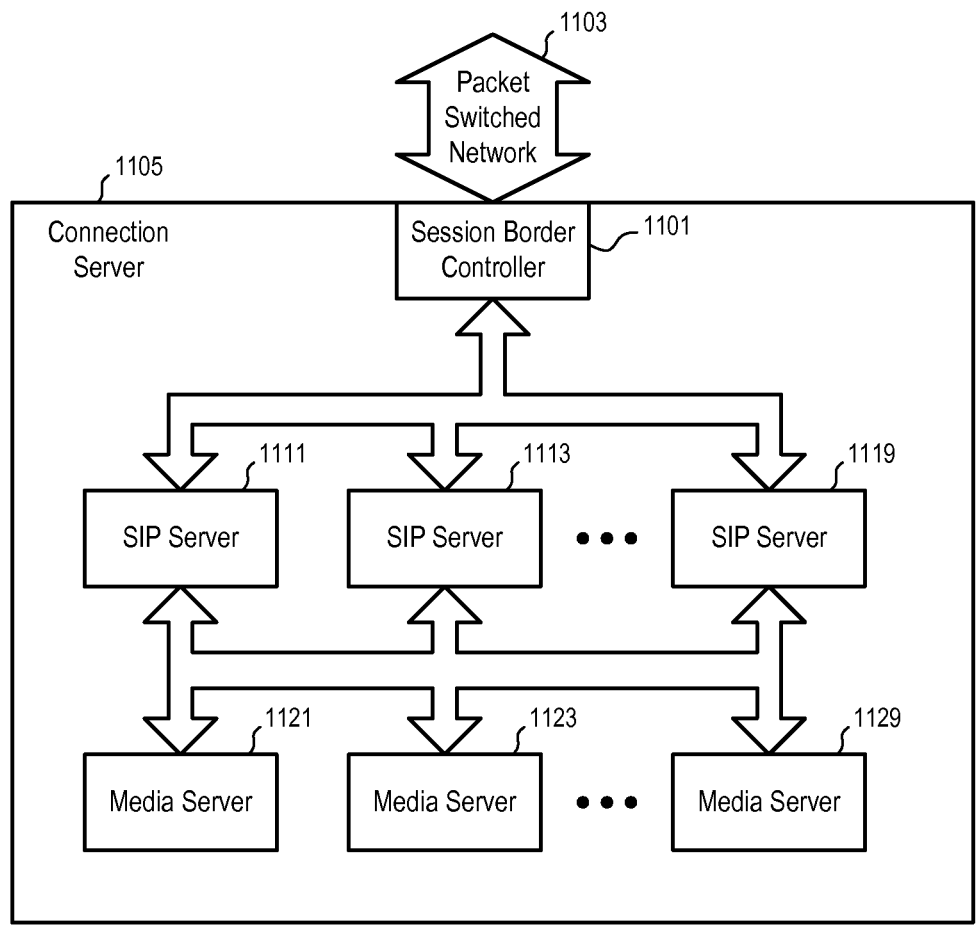
FIG. 11 shows a connection server according to one embodiment.

FIG. 11 shows a connection server according to one embodiment. In FIG. 11, the connection server (1006) is configured to place and/or receive VoIP calls using Session Initiation Protocol (SIP). A session border controller (1101) is used to interface with the packet switched network (1103) and control the types of network traffic related to VoIP calls that might go into the connection server (1105).

In one embodiment, the session border controller (1006) is configured to control the signaling and media stream during the setting up, conducting and tearing down of VoIP calls to or from the connection server (1105). In some embodiments, the session border controller (1006) may pick up the call that comes to the session border controller (1006), places a separate call from the session border controller (1006), and joins the received call and the placed call to control both the signaling and media stream. In some embodiments, the session border controller (1006) may perform signaling/encoding translation to allow the connection server (1105) to process the VoIP calls in one standard, while receiving VoIP calls in a variety of standards (e.g., SIP, H.323, etc.). In one embodiment, the session border controller (1006) is configured to perform one or more firewall functionalities, such as denial of service protection, call filtering, bandwidth management, etc.

In one embodiment, the session border controller (1006) is configured to perform media releasing operation. When the session border controller (1006) determines that the source and destination of a media stream is on the same side of the session border controller (1006) (e.g., both the source and the destination of the media stream is outside the connection server 1105), the session border controller (1006) can release the hairpining of the media stream and allow the media stream to flow without going through the session border controller (1006).

In FIG. 11, a set of SIP servers (e.g., 1111, 1113, ..., 1119) are networked to the session border controller (1101) to receive messages for incoming calls and to initiate outgoing calls. The session border controller (1101) is configured to evenly distribute the calls for processing by the SIP servers.

For example, when an incoming message for the initiation of a call is received (e.g., a SIP INVITE message from the telecommunication carrier 1005), the session border controller (1101) may route it to a SIP server (e.g., 1111) for processing. The INVITE message includes the phone number dialed by the caller and the contact information about the caller (e.g., the phone number of the caller 1001 and/or the identity of the virtual SIP phone at the telecommunication carrier 1005).

The SIP server may determine whether the phone number dialed by the caller (1003) is sufficient to determine the phone number of the callee (e.g., 1003). If the phone number of the callee (e.g., 1003) can be determined from the phone number dialed by the caller (1003) (e.g., via decoding the phone number dialed by the callee, or looking up the phone number of the callee from a table using the phone number dialed by the caller as a key), the SIP server can place a separate SIP call to the callee via the packet switched network (1103) and then connect the caller and the callee. Alternatively, the SIP server can further route the SIP INVITE message (e.g., to the telecommunication carrier (1005) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identifies a media server (1121) (or a virtual softphone on SIP server) as the initiator for a separate call. The SIP server then connects the calls for the media stream.

In one embodiment, the caller is first connected to a media server (e.g., 1121, 1123, or 1129). For example, the SIP server may forward the SIP INVITE message to one or more of the media servers for answering the call. When a media server (e.g., 1121) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (1103) (e.g., by sending a SIP INVITE message to the telecommunication carrier 1005, which further bridges the call to the callee 1003). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (1101) into the connection server (1105). For example, the media stream can go through the telecommunication carrier (1005) in FIG. 10 without going to the connection server (1007) after the SIP server connects the caller and the callee.

However, the SIP server stays on the signaling path to monitor the progress and termination of the call. The SIP server can also break the connection between the caller and the callee, or force the media stream to come through the connection serve (1105). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (1103) for a connection to the caller. The SIP call may be bridged onto a circuit switched network (e.g., by a telecommunication carrier 1005). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (1111, 1113, . . . , 1119) and media servers (1121, 1123, . . . , 1129) are implemented on separate computers connected via a local area network (and/or intranet or Internet). Alternatively, at least the some of the servers can be implemented on a same computer. In one embodiment, the SIP servers and the media servers are also integrated with the session border controller (1101) on a same data process system having multiple processors coupled with a data bus. In one embodiment, the SIP servers are coupled to the media servers via a network; and a SIP server may use any of the available media server for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (1105) may further include a database server (1105) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the disclosure.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the disclosure. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the disclosure may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the embodiments. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
    receiving, from a first device, over a first communication channel, a first request for a first connection between a second device and a destination, wherein the first request comprises a reference identifying the second device;
    in response to the first request,
        providing, over a second communication channel, a first code to the second device using the reference;
        receiving a second code over the first communication channel from the first device;
        determining, by a computing device, whether the first code matches the second code;
        in response to a determination that the first code matches the second code,
            storing, by the computing device, information to associate the reference identifying the second device with the first device; and
            initiating, by the computing device, the first connection between the second device identified by the reference and the destination; and
    subsequent to the storing of the information to associate the reference and the first device,
        receiving a second request, including the reference, from the first device for a second connection to the second device identified by the reference included in the second request; and
        initiating, by the computing device, the second connection without further transmitting a code to the second device identified by the reference for confirmation that the second request is originated from a user of the second device
    wherein the initiating of the first connection between the second device and the destination comprises:
        initiating, by the computing device, a third connection between the second device and a connection provider, wherein the initiating of the third connection comprises the connection provider placing a first Voice over Internet Protocol (VoIP) call using the reference to a telecommunication carrier which bridges the first VoIP call to a public switched telephone network (PSTN);
        initiating, by the computing device, a fourth connection between the connection provider and the destination, wherein the initiating of the fourth connection comprises the connection provider placing a second Voice over Internet Protocol (VoIP) call to a telecommunication carrier which bridges the second VoIP call to a public switched telephone network (PSTN) to the destination; and
        bridging, by the computing device, the third connection and the fourth connection, wherein the bridging comprises connecting the first and second VoIP calls;
        wherein a first virtual softphone terminates the first VoIP call for bridging onto a public switched telephone network (PSTN); a second virtual softphone terminates the second VoIP call for bridging onto a public switched telephone network (PSTN); and the connecting of the first and second VoIP calls comprises directing the first and second softphones to establish a direct media connection which does not go through the connection provider.

2. The method of claim 1, wherein the reference comprises a phone number; and the first connection comprises a phone connection between the second device and the destination.

3. The method of claim 1, wherein the reference comprises a session initiation protocol (SIP) address.

4. The method of claim 3, wherein the first connection comprises a voice connection.

5. The method of claim 3, wherein the reference comprises a uniform resource identifier (URI).

6. The method of claim 1, wherein the first connection comprises an instant messaging connection.

7. The method of claim 1, wherein the reference comprises a phone number; and the first communication channel comprises short message service (SMS).

8. The method of claim 1, wherein the providing of the first code to the second device using the reference comprises:
determining, by the computing device, an address based on the reference; and
providing, by the computing device, the code to the address according to the reference.

9. The method of claim 8, wherein the address comprises an email address.

10. The method of claim 8, wherein the address comprises an instant messaging identifier.

11. The method of claim 10, wherein the code is provided to the address as a presence status information.

12. The method of claim 1, further comprising:
providing, by the computing device, a reference in an advertisement; and
charging a fee for the advertisement in response to a connection made to the destination via the reference provided in the advertisement and the reference received in the first request for the first connection.

13. The method of claim 1, wherein the first code comprises a Completely Automated Public Turing test to tell Computers and Humans Apart (CAPTCHA).

14. The method of claim 1, wherein the first code matches the second code if the first code is not the same as the second code but has a predetermined relation with the second code.

15. The method of claim 1, wherein the first code is provided in a text format, an audio format, a voice format, or a video format.

16. A non-transitory computer-readable storage medium storing computer-readable instructions which when executed, cause a system to perform:
receiving, from a first device, over a first communication channel, a first request for a first connection between a second device and a destination, wherein the first request comprises a reference identifying the second device;
in response to the first request,
providing, over a second communication channel, a first code to the second device using the reference;
receiving a second code over the first communication channel from the first device;
determining, by a computing device, whether the first code matches the second code;
in response to a determination that the first code matches the second code,
storing, by the computing device, information to associate the reference identifying the second device with the first device; and
initiating, by the computing device, the first connection between the second device identified by the reference and the destination; and
subsequent to the storing of the information to associate the reference and the first device,
receiving a second request, including the reference, from the first device for a second connection to the second device identified by the reference included in the second request; and
initiating, by the computing device, the second connection without further transmitting a code to the second device identified by the reference for confirmation that the second request is originated from a user of the second device;
wherein the initiating of the first connection between the second device and the destination comprises:
initiating, by the computing device, a third connection between the second device and a connection provider, wherein the initiating of the third connection comprises the connection provider placing a first Voice over Internet Protocol (VoIP) call using the reference to a telecommunication carrier which bridges the first VoIP call to a public switched telephone network (PSTN);
initiating, by the computing device, a fourth connection between the connection provider and the destination, wherein the initiating of the fourth connection comprises the connection provider placing a second Voice over Internet Protocol (VoIP) call to a telecommunication carrier which bridges the second VoIP call to a public switched telephone network (PSTN) to the destination; and
bridging, by the computing device, the third connection and the fourth connection, wherein the bridging comprises connecting the first and second VoIP calls;
wherein a first virtual softphone terminates the first VoIP call for bridging onto a public switched telephone network (PSTN); a second virtual softphone terminates the second VoIP call for bridging onto a public switched telephone network (PSTN); and the connecting of the first and second VoIP calls comprises directing the first and second softphones to establish a direct media connection which does not go through the connection provider.

17. A system, comprising:
a memory; and
at least one processor coupled to the memory to:
receive over a first communication channel, a first request for a first connection between a second device and a destination, wherein the first request comprises a reference identifying the second device;
in response to the first request,
provide, over a second communication channel, a first code to the second device using the reference;
receive a second code over the first communication channel from the first device;
determine whether the first code matches the second code;
in response to a determination that the first code matches the second code,
store information to associate the reference identifying the second device with the first device;
initiate the first connection between the second device identified by the reference and the destination; and
subsequent to storing of the information to associate the reference and the first device,
receive a second request, including the reference, from the first device for a second connection to the second device identified by the reference included in the second request; and initiate the second connection without further transmitting a code to the second device identified by the reference for confirmation that the second request is originated from a user of the second device;

wherein the initiating of the first connection between the second device and the destination comprises:

initiating a third connection between the second device and a connection provider, wherein the initiating of the third connection comprises the connection provider placing a first Voice over Internet Protocol (VoIP) call using the reference to a telecommunication carrier which bridges the first VoIP call to a public switched telephone network (PSTN);

initiating a fourth connection between the connection provider and the destination, wherein the initiating of the fourth connection comprises the connection provider placing a second Voice over Internet Protocol (VoIP) call to a telecommunication carrier which bridges the second VoIP call to a public switched telephone network (PSTN) to the destination; and bridging the third connection and the fourth connection, wherein the bridging comprises connecting the first and second VoIP calls;

wherein a first virtual softphone terminates the first VoIP call for bridging onto a public switched telephone network (PSTN); a second virtual softphone terminates the second VoIP call for bridging onto a public switched telephone network (PSTN); and the connecting of the first and second VoIP calls comprises directing the first and second softphones to establish a direct media connection which does not go through the connection provider.

* * * * *